H. O. PECK.
VEHICLE WHEEL.
APPLICATION FILED DEC. 7, 1907.
925,021.
Patented June 15, 1909.
3 SHEETS—SHEET 1.
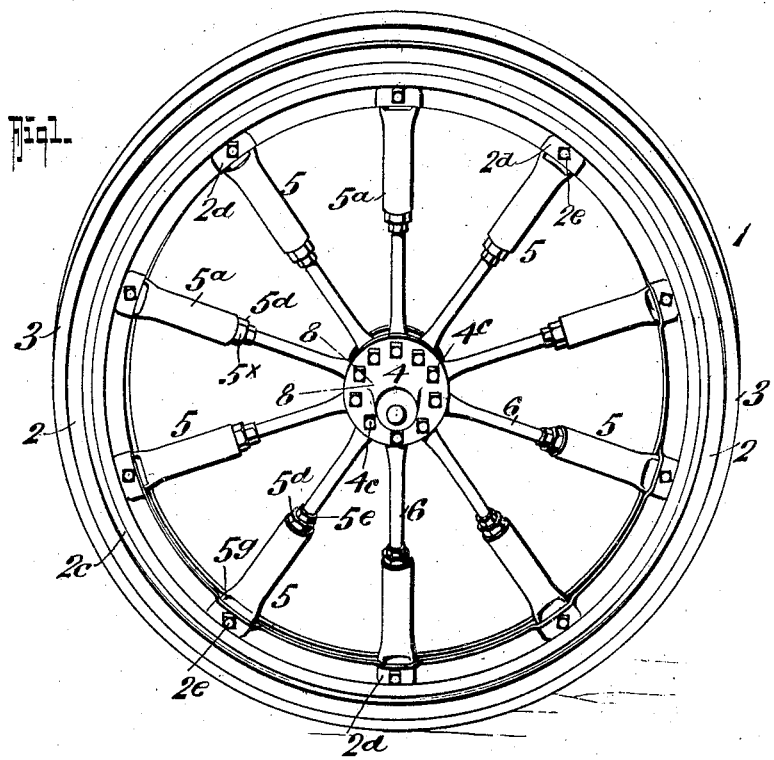
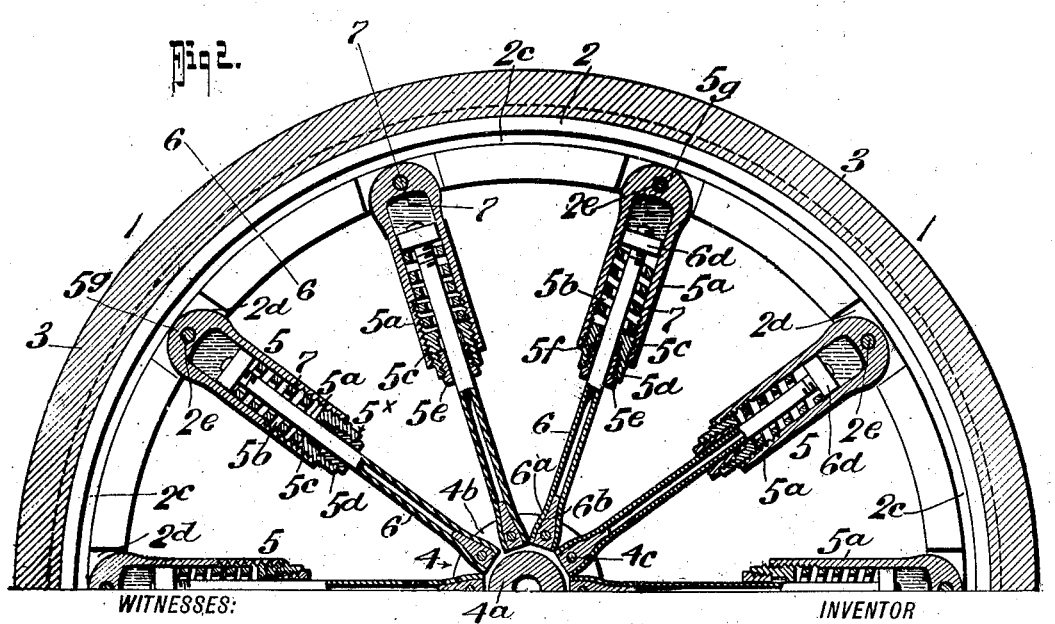
WITNESSES:
John T. Schrott
Charles H. Wagner
INVENTOR
Hartwig Otto Peck.
BY
Fred G. Dieterich & Co
ATTORNEYS H. O. PECK.
VEHICLE WHEEL.
APPLICATION FILED DEC. 7, 1907.
925,021.
Patented June 15, 1909.
3 SHEETS—SHEET 2.
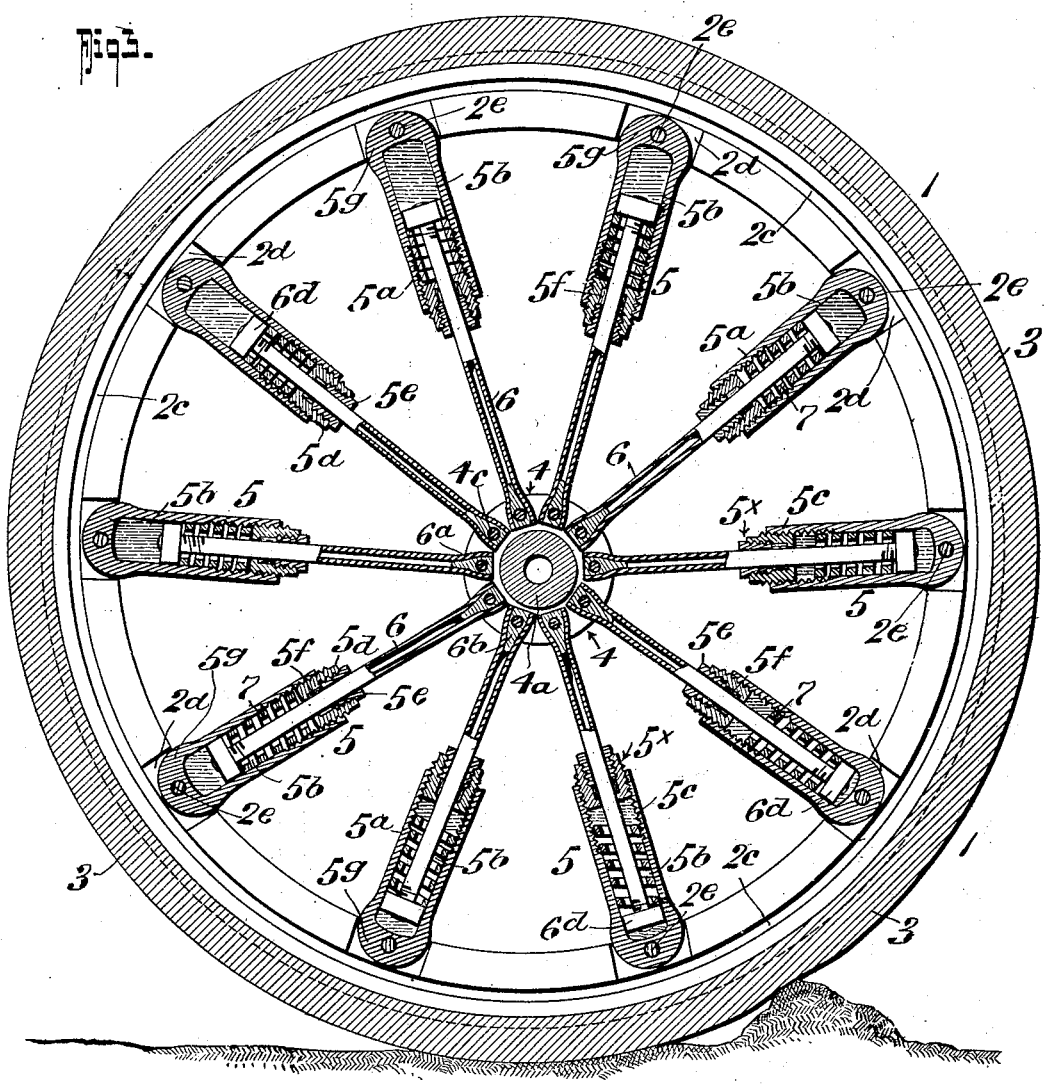
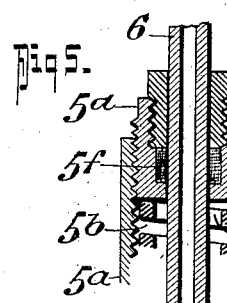
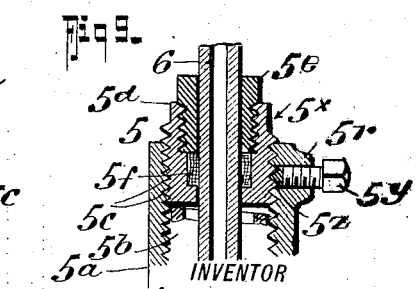
WITNESSES:
John T. Schrott.
Charles H. Wagner.
INVENTOR
Hartwig Otto Peck.
BY
Fred G. Dieterich & Co.
ATTORNEYS

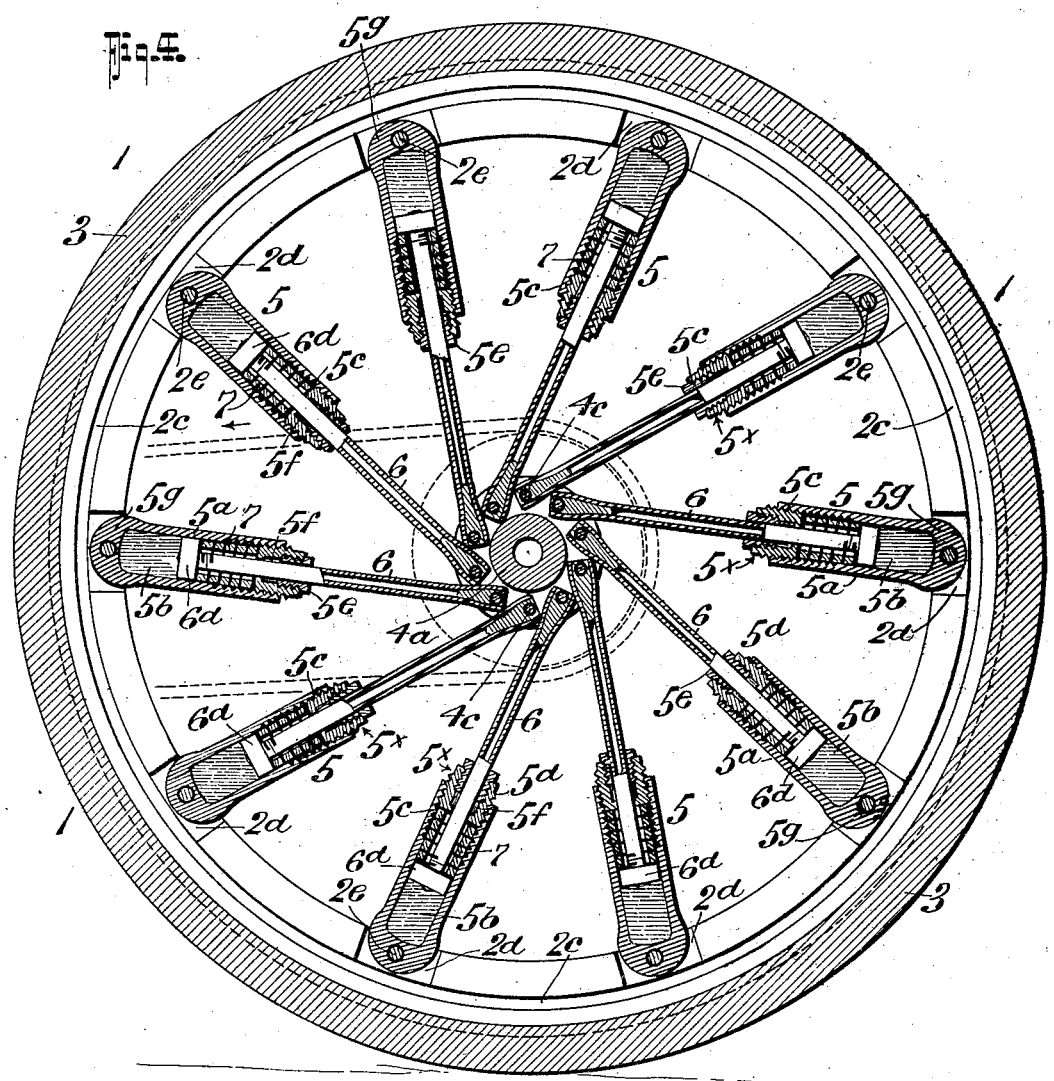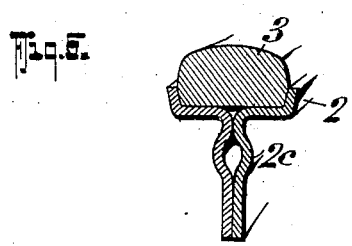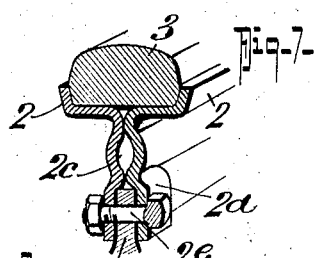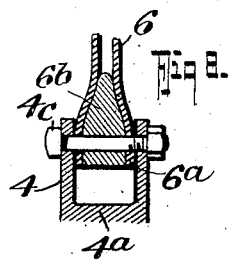

UNITED STATES PATENT OFFICE.

HARTWIG O. PECK, OF PORTLAND, OREGON, ASSIGNOR, BY DIRECT AND MESNE ASSIGNMENTS, TO H. O. PECK AUTOMOBILE WHEEL COMPANY, OF PORTLAND, OREGON, INCORPORATED.

VEHICLE-WHEEL.

No. 925,021.    Specification of Letters Patent.    Patented June 15, 1909.

Application filed December 7, 1907. Serial No. 405,554.

*To all whom it may concern:*

Be it known that I, HARTWIG O. PECK residing at Portland, in the county of Multnomah and State of Oregon, have invented certain new and useful Improvements in Vehicle-Wheels, of which the following is a specification.

My invention relates to certain new and useful improvements in vehicle wheels of the spring type, and it primarily has for its object to provide a wheel of an improved construction which can be easily manufactured at a comparatively low cost and which will readily and effectively serve its intended purposes.

Generically, my invention embodies a wheel having a rim of a special construction to which the spokes of the wheel are pivotally secured and a hub to which the spokes are also secured, the spokes being of a special construction which will be hereinafter fully described.

The improved type of spoke which forms a part of my invention generically comprises a tubular casing member which is pivotally secured to the rim, and a rod-like member that is pivotally secured to the hub, the rod member entering the casing member and coöperating with a coil spring to act as a buffer or shock absorber, the casing being closed where the rod passes into the same by a peculiarly constructed closure member by means of which the tension on the spring can be adjusted and also the closure member includes a stuffing box whereby the casing can be closed in such manner that it may be filled with oil or other suitable lubricant.

With other objects in view, which will be hereinafter fully apparent to those skilled in the art to which the invention appertains, the invention embodies certain novel details of construction, combination and arrangement of parts all of which will be first described and then be specifically pointed out in the appended claim, reference being had to the accompanying drawings, in which,—

Figure 1, is a perspective view of a wheel embodying my invention. Fig. 2, is a central, vertical, longitudinal section of a half of the wheel with the parts in the position shown in Fig. 1. Fig. 3, is a similar view showing the position of the parts when the wheel strikes an obstruction. Fig. 4, is a similar view showing the position of the parts when power is applied to turn the wheel through the medium of a sprocket and chain or other suitable gearing. Fig. 5, is an enlarged detail section of one of the spoke members. Fig. 6, is a detail cross section of the rim on the line 6—6 of Fig. 2. Fig. 7, is a similar view on the line 7—7 of Fig. 2. Fig. 8, is a detail view on the line 8—8 of Fig. 1. Fig. 9, is a detail view of a modification.

Referring now to the accompanying drawings in which like characters of reference indicate like parts in all of the figures, 1 designates the wheel which embodies my invention and which in its general make-up comprises the rim 2 that receives the tire 3, and the hub 4, to which and to the rim the spokes 5 are secured. The rim 2 and spokes 5 together with the coöperative connection of the spokes with the hub and the rim, and the spoke construction form the essential features of my invention.

The rim 2 is in practice preferably formed of thin metal bent into the shape shown in Figs. 6 and 7 to form a groove to receive the tire 3. In order to stiffen the rim and prevent buckling of the wheel, the rim is formed with a circular bead $2^c$ in each section and where the spokes 5 join with the rim the rim is formed with pocket-like portions $2^d$ through which the bolts $2^e$ pass, the bolts $2^e$ serving not only to secure the rim sections together, but as pivots for the spoke ends.

The hub 4 is provided with a bearing portion $4^a$ and side disks $4^b$ between which the ends of the spokes are pivoted on bolts $4^c$.

The spokes 5 which form a very essential part of my invention each comprise a tubular member $5^a$ that has a flattened end $5^g$ through which the pivot bolts $2^e$ pass and is provided with an internal chamber $5^b$, as shown.

The open end of the tubular member $5^a$ is internally threaded as at $5^c$, to receive the cap $5^d$ which has a nut portion $5^x$ by means of which the cap can be screwed into and out of the tubular section $5^a$ for purposes which will presently appear.

The cap $5^d$ has an internally threaded chamber to receive the bushing $5^e$ and serves as a stuffing box with the packing $5^f$ and through which the spoke section 6 projects.

The spoke section 6 is preferably a tubular rod, although a solid one may be used if desired, and passes through the stuffing box and cap into the chamber 5^b in the spoke section 5^a. The end of the rod 6 within the chamber 5^b may be threaded to receive a piston 6^d which may be immovably secured in place in any desired manner, such for instance, as upsetting the end of the rod 6 or in any other approved way. Between the piston 6 and the cap 5^d a flat coil spring 7 is held within the chamber 5^b and around the rod 6 to serve to force the piston 6^d toward the outer end of the spoke section 5^a as will be presently apparent. The hub end of the spoke section 6 is flared as at 6^a and may be reinforced by a block of wood 6^b or other suitable means if desired.

I also prefer to fill the tubular sections 5^a of the spokes with oil or other suitable lubricant to serve several purposes, first, to lubricate the parts, and second, to act in connection with the piston as a compression medium and serve thereby as a buffer.

Inasmuch as the pistons 6^d are not packed, the oil will pass by the piston during the movement of the piston, it being understood that the passage of the oil will not take place until the piston has moved to compress the same and then such passage will be slow so that the oil acts as a buffer in the manner of the ordinary dash pot. This is indicated in Figs. 3 and 4 of the drawings.

I have shown in Fig. 9 that I may provide the tubular member 5^a with a lug 5^r to receive a set screw 5^y and a brass or other suitable member 5^z to engage the cap 5^d and lock it in its adjusted positions.

In the practical application of my invention the path of movement of the piston 6^d within the cylindrical or tubular section 5^a of the spoke is of such length that when the rod 6 is pulled out as far as possible in a direction away from the spoke section 5^a the spring 7 will be compressed and will reach its position of maximum compression before the opposite spoke can contact the closed end of the casing 5^a. This will be readily apparent by reference to Fig. 3, which shows the wheel striking an obstruction. This is to prevent any downward strain on the spoke sections while in their telescoped position, but compel the hub of the wheel to always hang on the upper half of the spokes.

By reference to Fig. 2, the normal position of the parts will be seen wherein the pistons 6^d are all acting under their compression influence, the forces of the several springs 7 tending to balance the parts, with the hub 4 at the center of the wheel.

When the wheel strikes an obstruction the parts will assume more or less the position shown in Fig. 3 and when sudden power is applied to a drive wheel constructed in accordance with my invention as indicated in Fig. 4, then the entire forces acting to turn the hub will serve to pull on the spoke section 6 against the action of the spring 7 and turn the wheel. If the force is such as to turn the parts into the position shown in Fig. 4, then all the springs 7 will be compressed to their maximum position and serve as a solid metallic connection between the two spoke sections, as shown in Fig. 4, so that a direct pull between the hub and the rim may be obtained and the wheel act in the position shown in Fig. 4 substantially as a solid spoke wheel, and at the same time as the vehicle is started up and its speed increases the tension of the springs 7 will gradually draw the parts into their normal position shown in Figs. 1 and 2.

By providing the adjustable cap 5^d for the ends of the tubular members 5^a the tension of the spring 7 can be adjusted so that when the wheel parts are assembled the same may be "trued up" by adjusting the cap 5^d.

From the foregoing description taken in connection with the accompanying drawings, it is thought the complete construction, operation and advantages of my invention will be readily appreciated by those skilled in the art to which the invention appertains.

What I claim is:

In a vehicle wheel, a hub and a rim, a series of resilient spokes each comprising an outer casing having one end open and the other end closed and flattened, means for pivoting said outer casing through the flattened end to the rim, a rigid rod projected into said casing, a piston on the end of said rod within the casing, the other end of said rod being apertured, means for pivoting said apertured end of the rod to the hub, a coil spring rectangular in cross section held around said rod within the casing and abutting said piston, an adjustable apertured closure plug for the open end of said casing through which said rod passes and against which said spring abuts, a liquid substantially filling the casing to cause the piston and casing to act as a "dash-pot", said piston being of such diameter as to permit slow passage of the liquid upon the movement of the piston within the casing, the pivotal connection between the casing and the rim and the pivotal connection between the rod and the hub having sufficient movement that when the hub is turned and the turning movement of the rim is retarded all of the rods will be drawn toward the hub and all of the springs placed under maximum compression to form a rigid connection between the piston and the closure plug of the casing to form a rigid wheel.

HARTWIG O. PECK.

Witnesses:
A. E. DIETERICH,
FRED. G. DIETERICH.